United States Patent [19]
Shafranovsky et al.

[11] 4,198,361
[45] Apr. 15, 1980

[54] FILM-TYPE ROTARY MASS-AND-HEAT EXCHANGE COLUMN

[76] Inventors: Alexandr V. Shafranovsky, Balashikha-4, Molodezhnaya ulitsa 4, kv. 7, Moskovskaya oblast; Vitaly R. Ruchinsky, prospekt Mira 202, kv. 21, Moscow; Viktor M. Olevsky, Leningradsky prospekt 75a, kv. 91, Moscow; Vladimir P. Gavrilin, Kastanaevskaya ulitsa 27, Korpus 5, kv. 25, Moscow; Vladimir K. Chubukov, Komsomolsky prospekt 41, kv. 97, Moscow; Valentina N. Gromoglasova, uilitsa P. Korchagina 1, kv. 72, Moscow; Vladimir S. Bushev, Balaklavsky prospekt 4, Korpus 3, kv. 206, Moscow; Jury A. Baskov, shosse Entuziastov 156, kv. 20, Moscow; Violetta V. Kurkovskaya, prospekt Mira, 99, kv. 12, Moscow; Boris A. Gurkov, ulitsa Geroev Panfilovtesv 13, kv. 116, Moscow; Ivan F. Evkin, bulvar Matrosa Zheleznyaka 9a, kv. 78, Moscow, all of U.S.S.R.

[21] Appl. No.: 948,990
[22] Filed: Oct. 4, 1978
[51] Int. Cl.² .................................................. B01F 3/04
[52] U.S. Cl. ..................................... 261/89; 159/6 R; 202/236; 261/152
[58] Field of Search .................. 261/25, 84, 88–90, 261/ 112, 142, 152, 155, 156, 24; 159/6 R; 202/236; 203/89; 196/112

[56] References Cited

U.S. PATENT DOCUMENTS

| 1,786,150 | 12/1930 | Cutler | 261/89 |
| 2,228,425 | 1/1941 | Venderbush | 261/90 |
| 2,387,231 | 10/1945 | Bottoms et al. | 261/89 |
| 2,944,801 | 7/1960 | Katz et al. | 261/24 |
| 3,151,043 | 9/1964 | Beattie et al. | 261/89 X |
| 3,466,019 | 9/1969 | Priestley | 261/112 |
| 3,618,778 | 11/1971 | Benton et al. | 261/112 X |
| 4,038,353 | 7/1977 | Shafranovsky et al. | 261/89 |

FOREIGN PATENT DOCUMENTS 203621 12/1967 U.S.S.R. .................................................. 261/89

*Primary Examiner*—Richard L. Chiesa
*Attorney, Agent, or Firm*—Haseltine, Lake & Waters

[57] ABSTRACT

The film-type rotary mass-and-heat exchange column comprises a shell which accommodates a vertical shaft carrying the contact stages held in position thereto. The contact stages are formed by the bands curved into the spirals diverging from the shaft and flanged towards the latter at their edges. The bands are provided with longitudinal beads bulging outwards on the concave surface of the bands so as to establish a number of channels adjacent for height.

13 Claims, 15 Drawing Figures

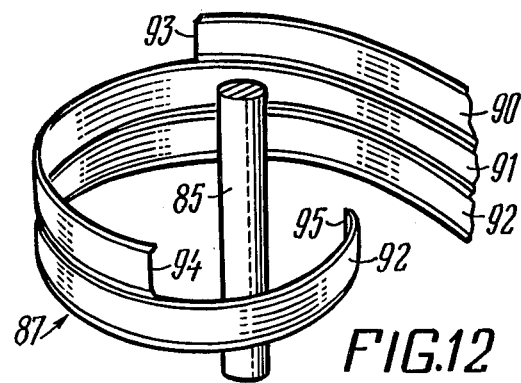
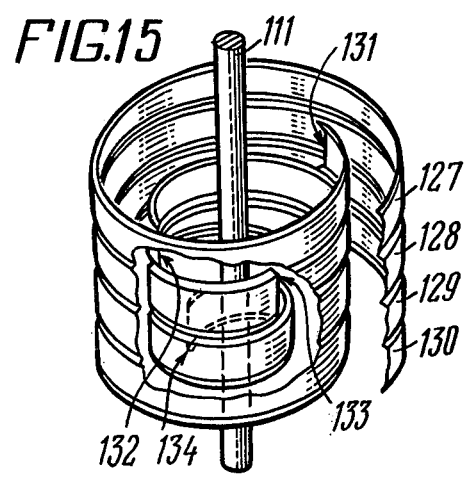

FILM-TYPE ROTARY MASS-AND-HEAT EXCHANGE COLUMN

This invention relates generally to equipment for carrying out mass-and-heat transfer processes and has particular reference to a film-type rotary mass-and-heat exchange column adapted for conducting various processes involving liquid and gas, such as distillation, rectification, absorption and wet purification of gases from dust. The most preferable field of application of the present invention lies with vacuum distillation and rectification of substances sensitive to elevated temperatures, e.g., lactams, fatty acids, polyhydric alcohols, ethanolamines, low-boiling esters, various oils, food products and pharmaceuticals.

One prior-art film-type rotary mass-and-heat exchange column is known to comprise a vertical shell with means for feeding therein the original stock involved in the process and discharging the end products therefrom; a vertical shaft rotatably mounted in said shell; a number of contact stages held to the shaft; and a device for the liquid to flow over from stage to stage. The contact stages spaced somewhat apart are made of bands curved into spirals diverging from the shaft, said bands being flanged at their edges towards the shaft. The devices for the liquid to flow over from stage to stage are made as circular pockets and downflow spouts, the circular pockets being fixed on the inner side wall of the shell and adapted to receive the liquid thrown off from the contact stages. The downflow spouts are located within the space between the contact stages. The intake ends of the downflow spouts communicate with the circular pockets adapted for receiving the liquid flowing down from the superjacent contact stages. The discharge ends of the downflow spouts are situated above the subjacent contact stages.

The column shell may be provided with an outside jacket.

When the aforesaid known column operates the gas is fed thereinto from below through the inlet sleeve in the shell bottom portion to pass through all the contact stages while flowing via the gaps between the bands, and is removed from the column through the outlet sleeve in the top portion thereof. At the same time the liquid is fed through the inlet sleeve in the top column portion to the uppermost contact stage, where the liquid is acted upon by the centrifugal forces to get onto the inside surface of the spiral bands facing the shaft, from whence it flows along a spiral pathway from the centre of a contact stage towards the periphery thereof while contacting the counterflowing gas. Then the liquid is thrown from the peripheral portion of the rotating contact stage onto the inside surface of the column shell in the form of drops and streams, whereupon the liquid flows down in the form of a film along the shell walls under gravitational forces to get into the circular pocket which embraces the contact stage. From the circular pocket the liquid arrives at the intake end of the downflow spout, whereas through the outlet end thereof the liquid is discharged onto the next contact stage situated below the previous one. Upon being thrown from the lowermost contact stage the liquid is brought out from the column through the outlet sleeve in the bottom shell portion. The mass-and-heat transfer process occurs in the column within the gaps between the spiral bands, in the spray cloud formed in the space between the contact stages and the shell walls, as well as in the film irrigating the shell inner surface.

In the course of operation of said known mass-and-heat exchange column the inside surface of the shell thereof is run by the streams and sprays of liquid thrown off from the rotating contact stages and is partially covered by a turbulized liquid film. In cases where the column is provided with an outside jacket, wherein a heat-transfer medium or a refrigerant circulates, the cooling, heating or even evaporating of the liquid film may be carried out on the inside surface of the column shell along with the mass-and-heat transfer processes proceeding on the spiral bands themselves.

However, the heretofore known mass-and-heat exchange column of the character set forth hereinbefore suffers from a number of disadvantages that affect adversely the efficiency of the mass-and-heat transfer process.

One of such disadvantages resides in too low a utilization factor of the column effective volume, said factor being equal to the ratio between the space occupied by the contact stages and the whole cubage of the column. Said factor is always less than unity as some gap is left at all times in between the contact stages, serving only for the downflow spouts to be situated but not utilized directly for the liquid and gas to contact each other. Therefore one would think that the factor of utilization of the column effective volume can be increased by virtue of extended height of the contact stages, i.e., the width of the spiral bands making up the contact stages. This would make it possible to reduce the number of the contact stages in a column of a predetermined height and thence the number of the gaps in the column. Inasmuch as the height of said gaps features no substantial dependence upon the height of the contact stages, the amount of the effective volume of the column occupied by the gaps would be diminished due to a reduced total number thereof. This, in turn, would lead to a higher factor of utilization of the column effective volume and, consequently, would enhance the efficiency of the mass-and-heat transfer process in the column.

However, in actuality the height of the contact stage cannot be increased infinitely. The point is that the liquid film covering the inside surface of the spiral bands flanged at their edges towards the shaft, is acted upon by the centrifugal force directed from the centre of the contact stage towards its periphery, and by the gravitational force directed downwards. The resultant of all forces acting upon the liquid film urges the latter to shift predominantly to the bottom flanged edge of the spiral band. Thus, the film gradually attenuates from the bottom edge to the top edge thereof. That is why an increase in the height of the contact stage or (what is just the same) the width of the spiral band beyond a certain limit specified for a preset rate of liquid flow would result in an incomplete wetting of the spiral band, with the result that the band portion contiguous to its top flanged edge would be left unwetted with the liquid. Eventually, the top portion of the contact stages would be ruled out from the mass-and-heat transfer process, and the factor of utilization of the column effective volume would remain at the same low level.

Thus, the heretofore known film-type rotary mass-and-heat exchange column features the constructional peculiarities that restrict more complete utilization of the column effective volume and therefore affect adversely the efficiency of the mass-and-heat transfer process occurring in the column.

Another disadvantage inherent in the known film-type rotary mass-and-heat exchange column resides in an inadequate turbulence of the gaseous phase passing in the gaps between the spiral bands from the bottom band edge to the top one. An additional turbulence of the gaseous phase within the gaps of the contact stage would make it possible to increase the efficiency of the mass-and-heat transfer process in the column.

One more disadvantage characteristic of the known film-type rotary mass-and-heat exchange column lies with an inadequately uniform turbulence of the film of liquid flowing down along the inside shell surface under the gravitational force. The liquid film is intensely turbulent only on a narrow annular strip of the shell inner wall, embracing immediately the periphery of the contact stage while a great proportion of the shell inner surface of the known column is either occupied by the circular pockets or covered by the liquid film quietly flowing down therealong. Thus, an increased portion of the shell surface area struck by sprays and streams of liquid would be conducive to a higher efficiency of the mass-and-heat transfer process on the wetted shell surface and thence in the column as a whole.

It is a primary and essential object of the present invention to provide a film-type rotary mass-and-heat exchange column featured by high factor of utilization of the effective volume thereof, wherein an additional turbulence of the gaseous phase occurs in the gaps between the spiral bands and an adequate turbulence of the liquid film takes place on the shell inner walls so as to intensify the mass-and-heat transfer process in the column.

Said object is attained due to the fact that in a film-type rotary mass-and-heat exchange column, comprising a vertical shell with means for feeding therein the original stock involved in the process and discharging the end products therefrom; a vertical shaft rotatably mounted in said shell; a number of contact stages held to said shaft, each of said stages being formed by bands curved into spirals diverging from the shaft and flanged towards the shaft at their edges; and at least one device for the liquid to flow over from one contact stage onto another, said device being made as a circular pocket adapted to receive the liquid thrown from the superjacent contact stage, said pocket being held to the inner side wall of the column shell, and a downflow spout whose intake end communicates with said circular pocket, while its discharge end is situated above the subjacent contact stage, according to the invention the bands are provided with longitudinal beads bulging outwards on the concave surface of the bands to form a number of channels adjacent for height.

Such a film-type rotary mass-and-heat exchange column makes it possible to use contact stages of larger height than in the known column, this being due to the fact that liquid flows along the spiral band through a number of adjacent channels at a time. Inadequacy of liquid spreading across the width of each of the channels can be minimized owing to a possibility of making the channels narrow enough (with a preset width of the spiral band) only by virtue of an increased number of the adjacent channels. At any rate of liquid flow (and, thence, amount of liquid flowing along the channels), the channels can always be made narrow enough for its bottom to be covered with the liquid film completely, even if the film will be somewhat thicker at the channel bottom edge than at the top edge thereof. At the same time the liquid gets spread more adequately over the entire width of the spiral band as compared to the known column, wherein use is made of the spiral bands having the same width but devoid of beads. In a film-type rotary mass-and-heat exchange column of a preset height, according to the invention, the contact stages may be less in number, while the factor of utilization of the column effective volume may be increased.

Moreover, the beads contribute to an additional turbulence of the gaseous phase passing in the gaps between the spiral bands, said turbulence occurring due to a curved pathway run by the gas flow which is made to pass round the convexes of the beads on one side of the gap and the concaves of the beads, on the other side of the gap.

Inasmuch as the liquid is thrown off from each of the contact stages onto the inner shell walls at a number of different levels, the film on the shell walls is turbulent at several levels rather than at a single level which is the case with the known exchanger apparatus, and therefore more uniformly than in the latter case. It is due to the fact that the number of the contact stages in the column may be reduced at the expense of their larger height that the total number of the circular pockets is reduced respectively and thence the proportion of the shell inside surface struck by sprays and streams of liquid thrown off from the contact stages is increased, accordingly.

Eventually, the efficiency of the mass-and-heat transfer process occurring in the film-type rotary mass-and-heat exchange column increases.

It is also desirable that the contact stage be made in such a way as to comprise the bands different in length and terminating at different distances from the shaft and that the different-length bands be arranged round the shaft in a periodically recurrent sequence. The construction of the contact stage in this case allows one to considerably increase the number of spiral bands originating in the vicinity of the shaft.

In the case where the liquid from the discharge end of the downflow spout is delivered immediately onto the top flanged edges of the spiral bands of the rotary contact stage, an increased number of the spiral bands and thence higher number of the adjacent channels in the vicinity of the shaft contribute to a more adequate spreading of the liquid among the different adjacent channels of the spiral bands in the central portion of the contact stage. This, in turn, provides for a proportional distribution of the liquid between the adjacent channels of the bands in the remaining portion of the contact stage as well. If the number of the spiral bands in the vicinity of the shaft is insufficient the amount of the liquid delivered to every particular spiral band per unit time would be too large, with the result that a greater proportion of the liquid would rush, under forces of inertia, towards the bottom flanged edge of the spiral band to fill predominantly the lower adjacent channels.

It is likewise advisable that the contact stages be provided with circular sleeves located in the central portion of the contact stages coaxially with the shaft under the discharge ends of the downflow spouts and communicating with the channels of the contact stages.

Such an embodiment of the contact stages facilitates distribution of the whole liquid flow among the various adjacent channels of the contact stages.

It is also recommended that the bottoms of the adjacent channels formed by beads be somewhat inclined towards the shaft and be so arranged that the line of conjugation of each bead with the bottom of the subjacent channel be more removed from the shaft than the line of conjugation of the same bead with the bottom of the superjacent channel. Such a construction of the spiral band would make it possible to use wider channels, as the thickness of the liquid film on the inclined channel bottom varies but insignificantly across the channel width. Thus, one could provide more uniform spreading of the liquid film across the width of the spiral band even with a low number of the channels in the spiral band (the number of channels and thence that of beads is not recommended to be increased unless actually necessary as the area of the band occupied by the bead does not participate in the mass-and-heat transfer process).

Furthermore, the thus-obtained configuration of the spiral bands causes still more curvature of the pathway run by the gas flow and yet more intensifies the mass-and-heat transfer process in the gaseous phase.

It is also expedient that the longitudinal beads be made corrugated which is conducive to still higher turbulence of the gas flow when the latter passes round the protruding beads in the gaps between the spiral bands. Said effect is especially manifested in the case of vacuum rectification where linear velocities of the gaseous phase amount to several scores of meters per second.

It is also favourable that the peripheral ends of the channels be somewhat constricted which will ensure more concentrated and directional discharge of the liquid onto the shell inner surface. As a result, more regular flow of liquid inside the column is attained, while any leakage of liquid in inappropriate directions is avoided.

It is also reasonable that the constricted peripheral ends of at least two adjacent channels of the spiral band of the contact stage be directed to the same spot of the shell wall, whereby it will be possible to provide vigorous intermixing of at least two liquid flows discharged from the adjacent channels of the same spiral band, intermixing occurring in the liquid film on the shell inside surface. The constructional arrangement of the contact stage enables liquids of different kind to be fed into the respective adjacent channels of the same spiral band. Thus, the contact stage may be simultaneously used for intermixing different liquids on the shell inside surface.

In cases where the shell wall gets cooled such an embodiment of the contact stage makes it possible to withdraw the heat evolved concurrently by chemically heterogeneous liquids while being intermixed.

It is likewise advantageous that the contact stage would contain a number of bands and that the constricted peripheral ends of the channels arranged at the same level would be spaced apart in height. Such an embodiment of the contact stage would be conducive to a most uniform turbulence of the liquid film flowing down along the shell inner surface. If the shell was provided with a heated jacket this would make it possible to use the film-type rotary mass-and-heat exchange column as an evaporator. This being the case, the mass-and-heat transfer process would occur on the spiral bands concurrently with the heat transfer process on the shell inside surface.

It is also appropriate that stepped recesses be provided on the central ends of the bands of the contact stages and that said recesses be arranged in such a manner that the adjacent channels of the bands would originate at such a distance from the shaft that is the longer the higher the level at which said channels are situated, and the discharge ends of the downflow spouts would be brought to the initial portions of the adjacent channels. Such a constructional arrangement of the contact stages would provide a simpler and more reliable distribution of the liquid among the variety of the channels of the contact stages.

It is likewise convenient that a plurality of the circular pockets be held in position on the inner side wall of the shell round each of the contact stages, equal in number to the adjacent channels of the band, said pockets serving for a separate reception of the liquid delivered from the channels of the band lying at different levels and being intercommunicated, through the downflow spouts, with the adjacent channels of the subjacent contact stages, said channels being situated respectively as for height. Such a constructional arrangement of a film-type rotary mass-and-heat exchange column would be conducive to a higher efficiency of the mass-and-heat transfer process occurring on the contact stages due to increased motive power of the process. For instance, in the course of rectification process liquid flows having different content of the volatile component would be delivered to each of the adjacent channels of the contact stage, the content of the volatile components being the greater the higher the respective spiral band channel.

Given below is a description of some exemplary embodiments of the present invention with due reference to the accompanying drawings, wherein:

FIG. 12 is a scaled-up isometric representation of the central end of the spiral band, according to the invention;

FIG. 15 is a scaled-up isometric representation of another embodiment of the central end of the spiral band with a portion thereof broken away, according to the invention.

Figure 1:
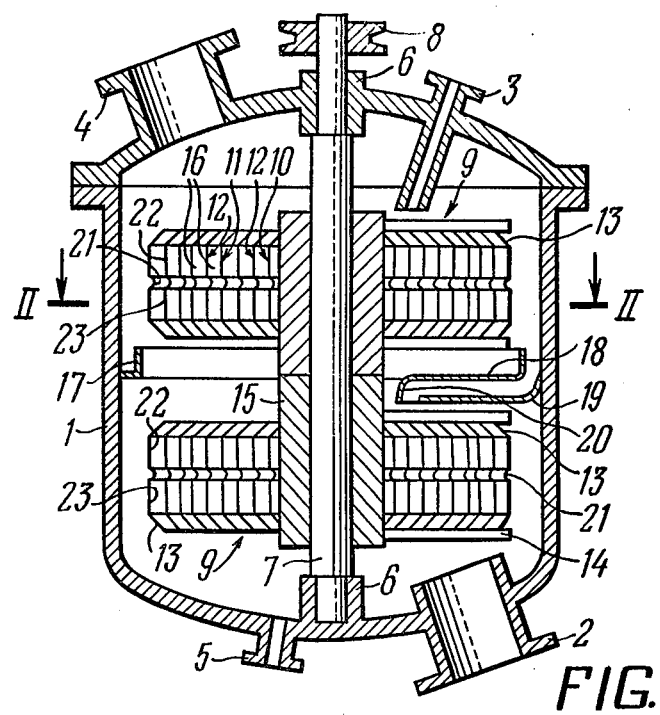
FIG. 1 is a longitudinal section view of a film-type rotary mass-and-heat exchange column, according to the invention.
Figure 2:
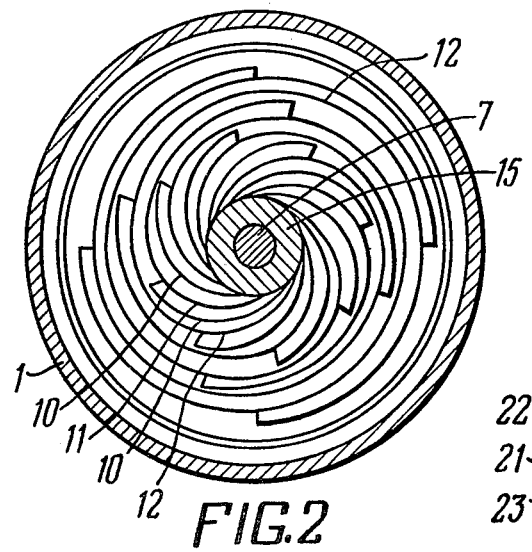
FIG. 2 is a section taken on the line II—II in FIG. 1.

Reference being now directed to the accompanying drawings, FIG. 1 represents the film-type rotary mass-and-heat exchange column to comprise a vertical cylinder-shaped shell 1 provided with means for admitting the original stock participating in the process and withdrawing the end products therefrom. Said means incorporate a bottom sleeve 2 for the gas to let in, a top sleeve 3 for the liquid to be let on, a top sleeve 4 for the gas to be let out and a bottom sleeve 5 for the liquid to let out. A vertical shaft 7 rotatable in bearings 6 is accommodated in the shell 1 coaxially therewith. The top extension of the shaft 7 carries a pulley 8 which transmits rotation to the shaft 7 from the driving mechanism not shown in the drawing. The shaft 7 mounts contact stages 9 spaced somewhat apart, said contact stages 9 being formed by bands 10, 11, 12 (FIGS. 1, 2).

The bands 10, 11, 12 are curved into spirals diverging from the shaft 7 and are flanged at their edges towards the shaft 7, i.e., edges 13 (FIG. 13) of the bands 10, 11, 12 are flanged towards the shaft 7. Thus, the bands 10, 11, 12 establish a sixteen-part spiral. The flanged edges 13 are adapted for retaining the liquid on the concave (i.e., facing the shaft 7) surface of the bands 10, 11, 12. The bands 10, 11, 12 are held in place on a central locating bushing 15 with the aid of radial bars 14. The bushing 15 serves for securing the contact stage 9 on the shaft 7, thereby making possible for the contact stage 9 to rotate, whereby the liquid is urged by centrifugal forces to flow as a film over the concave side of the bands 10, 11, 12 from the centre of the contact stage 9 towards its periphery along the flanged edges 13. Gaps 16 are provided in between the bands 10, 11, 12 for the gas contacting the liquid film to pass.

The flanged edges 13 of the bands 10, 11, 12 are commensurate in width with the amount of the gap 16. When looked at from above the contact stage 9 shows that the edges of the bands 10, 11, 12 to a great extent overlap or even completely close the gaps 16. Thanks to this fact, the liquid can be delivered immediately onto the top edges 13 of the bands 10, 11, 12 without any fear that even part of the liquid would fall from the contact stage 9. For instance, the top sleeve 3 serving for the liquid to be admitted to the shell may be simultaneously be adapted for the liquid to be fed immediately onto the top edges 13 of the bands 10, 11, 12 at the centre of the top contact stage 9. In this case any falldown of the liquid from the contact stage 9 is eliminated.

The film-type rotary mass-and-heat exchange column of the invention also incorporates a device for the liquid to flow over from one contact stage 9 onto the other. The device is fashioned as a circular pocket 17 held to the inner side wall of the shell 1, and a downflow spout 18. The circular pocket 17 serves for admitting the liquid thrown off from the superjacent contact stage 9. That is why the circular pocket 17 is situated somewhat below the respective contact stage 9. An intake end 19 of the downflow spout 18 communicates with the circular pocket 17, and its discharge end 20 is located above the subjacent contact stage 9. The downflow spout 18 is adapted for feeding the liquid from the circular pocket 17 onto the central portion of the subjacent contact stage 9.

Figure 3:
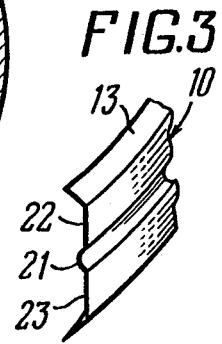
FIG. 3 is a scaled-up isometric representation of an element of the spiral band.

According to the invention the bands 10, 11, 12 are provided with longitudinal beads (FIGS. 1, 3) which bulge outwards on the concave surface of the bands 10, 11, 12 (FIG. 1). The beads 21 establish a number of channels 22, 23 adjacent in height. In an embodiment of the present invention represented in FIG. 1 the beads 21 are shaped cross-sectionally as a semicircle, the height of the beads 21 being much less than the amount of the gap 16 between the adjacent bands 10, 11, 12.

This feature provides for self-distribution of the liquid delivered onto the contact stage 9 in a single flow, among all the channels 22, 23 (adjacent for height) of the bands 10, 11, 12. In this case sprays and streams of the liquid first fill the topmost channel 22 of the band, while the liquid rushes downwards under the force of inertia. On that account the excess liquid flows from the topmost channel 22 over the ridge of the bead 21 into the bottom channel 23 of the band 10, 11 or 12 to fill it as well. If the bead 21 were too high only the top channel 22 would be run with the liquid, while admission to the bottom channel 23 would be blocked up by the bead 21 itself. Moreover, the beads 21 contribute to a curvature of the pathway run by the gas flow in the gaps 16 between the bands 10, 11, 12 which results in turbulence of said flow. According to the invention the bands 10, 11, 12 differ in length and terminate at different distances from the shaft 7. Moreover, the bands 10, 11, 12 are arranged round the shaft 7 in a periodically recurrent sequence. Hence the spiral made up by the bands 10, 11, 12 features sixteen starts in the central portion of the contact stage 9 and four starts at the periphery thereof.

It is due to the above feature that the liquid flow at the centre of the contact stage 9 is divided into sixteen branches, and at the periphery of the contact stage 9, into four branches. The peripheral ends of the bands 10 are brought nearly close to the concave surface of the bands 11, 12 as is evident from FIG. 2, whereas the peripheral ends of the bands 11 about upon the bands 12. Thereby the liquid from the top channels 22 (FIG. 1) of the bands 10, 11 flows down to the top channels 22 of the bands 11, 12, and distribution of the liquid between the adjacent channels 22, 23 remains unaffected throughout the entire contact stage 9; thus, an increased number of the bands and, consequently, of the adjacent channels at the centre of the contact stage 9, i.e., at the place of discharge of the liquid, is conducive to a better distribution of the liquid between the adjacent channels 22, 23 of the bands 10, 11, 12 of the whole contact stage 9.

The contact stages of the film-type rotary mass-and-heat exchange column of the present invention may be provided with circular sleeves communicating with the band channels adjacent in height. In addition, the spirals bands may have more intricate configuration.

Figure 4:
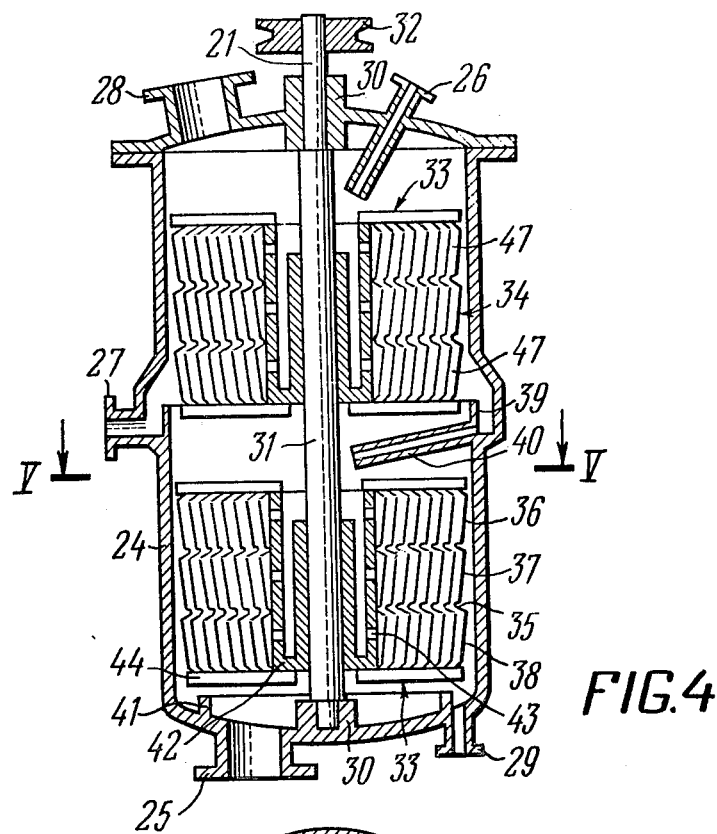
FIG. 4 is a longitudinal section view of an embodiment of a film-type rotary mass-and-heat exchange column, according to the invention.
Figure 5:
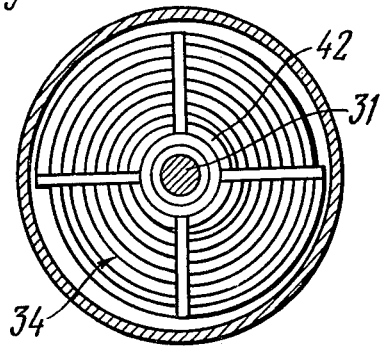
FIG. 5 is a section taken on the line V—V in FIG. 4.

Such being the case, the column features a vertical shell 24 (FIG. 4) provided with means for admitting the original stock involved in the process and withdrawing the end products therefrom. Said means include a bottom sleeve 25 for the gas vapour to let in, a top sleeve 26 for the liquid (reflux) to let in, a middle sleeve 27 for the process liquid (feed stock) to be let in, a top sleeve 28 for the gas vapour to be let out, and a bottom sleeve 29 for the liquid to be let out. A vertical shaft 31 rotatable in bearings 30 is accommodated in the shell 24 coaxially therewith. The top extension of the shaft 31 carries a drive pulley 32. The shaft 31 mounts contact stages 33 made up by bands 34 (FIGS. 4, 5). The bands 34 are curved into spirals diverging from the shaft 31 and flanged at the edges.

Figure 6:
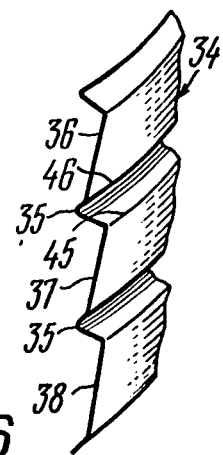
FIG. 6 is a scaled-up isometric representation of an element of another embodiment of the spiral band, according to the invention.

Longitudinal beads 35 (FIG. 6) subdivide the bands 34 into channels 36, 37, 38 adjacent as for height.

The device for the liquid to flow over from one contact stage 33 (FIG. 4) onto the other comprises a circular pocket 39 and a downflow spout 40.

One more circular pocket 41 is provided in the bottom portion of the shell 24, adapted for collecting the liquid thrown off from the bottommost contact stage 33. The circular pocket 41 communicates with the sleeve 29 for the liquid to be let out.

The contact stages 33 are provided with central circular sleeves 42. The circular sleeve communicates, through ports 43, with the respective channels 36, 37, 38 of the bands 34. As can be seen from FIG. 5, each of the contact stages 33 is built up by two spiral bands 34. As each of the bands 34 has three adjacent channels 36, 37, 38 a total of six various channels are available in the contact stage 33. That is why the circular sleeve 42 likewise has six ports 43, i.e., one per channel.

The circular sleeves 42 are fitted over the shaft 31. The discharge end of the downflow spout 40 and that of the liquid inlet sleeve 26 are located above the circular sleeve 42 provided with ports 43; the result is a uniform distribution of the liquid among the respective channels 36, 37, 38 of the contact stages 33.

The spiral bands 34 are interlinked with the circular sleeves 42 through radial ribs 44.

The bottoms of the adjacent channels 36, 37, 38 are somewhat inclined towards the shaft 31 so that a line 45 (FIG. 6) of conjugation of each longitudinal bead 35 with the bottom of the subjacent channel, say, one at Ref. No. 37 is more removed from the shaft 31 (FIG. 4) than a line 46 (FIG. 6) of conjugation of said bead 35 with the bottom of the superjacent channel, say, one at Ref. No. 36. Such a pattern of the bands 34 provides for a uniform spreading of the liquid film across the width thereof, this being due to the fact that while the contact stage 33 (FIG. 4) is rotating, a force is developed that urges the liquid film upwards to the top edge of the channels 36, 37, 38 while counteracting the force of gravity. In addition, the pathway of the gas flow passing along gaps 47 in between the bands 34 is heavily curved so that whirls arise in the gaseous phase when the latter moves at working velocities, said whirls intensifying the mass-and-heat transfer process.

In another embodiment of the film-type rotary mass-and-heat exchange column proposed herein further characteristic features of the present invention are realized.

According to said embodiment the column has a vertical shell 48 (FIG. 7) provided with means for admitting therein the original stock involved in the process and withdrawing the end products therefrom.

The herein-described column is adapted for vacuum rectification of nitric acid in the presence of magnesium nitrate which prevents formation of an azeotropic mixture of nitric acid with water. In this particular case the shell 48 is provided with a top sleeve 49 for admission of the reflux, viz., strong nitric acid, a middle sleeve 50 for admitting the process liquid, viz., a mixture of 60-percent nitric acid and 70-percent fused magnesium nitrate (30 percent being water) and a bottom sleeve 51 for letting out magnesium nitrate flux containing but a negligible amount of nitric acid. Apart from these sleeves, a sleeve 52 is for admission of water vapours, containing some nitric acid, and a sleeve 53 is for the vapours of strong nitric acid to be withdrawn.

A vertical shaft 54 rotatable in bearings 54 is accommodated in the shell 48 coaxially therewith. The shaft 55 carries contact stages 56, 57, 58 of different construction. The top contact stage 56 is constructionally similar to that of the known film-type rotary mass-and-heat exchange column; it is made up by spiral bands 59 having flanged edges but devoid of any beads. The contact stage 57 is adapted not only for the gas-to-liquid contact but also for intermixing liquids of different chemical behaviour; that is why said contact stage will hereinafter be referred to as a "mixing stage." The contact stage 57 is established by spiral flanged bands 60 provided with only one longitudinal bead 61 which divides their raceway into a top channel 62 and a bottom channel 63 adjacent to each other. The contact stage 57 is provided with two concentric sleeves 64 and 65 located at its centre and adapted for receiving two different liquids.

Peripheral ends 66, 67 (FIGS. 7, 8) of the channels 62, 63 are somewhat constricted and are pointed at the same area of the side wall of the shell 48.

Figure 7:
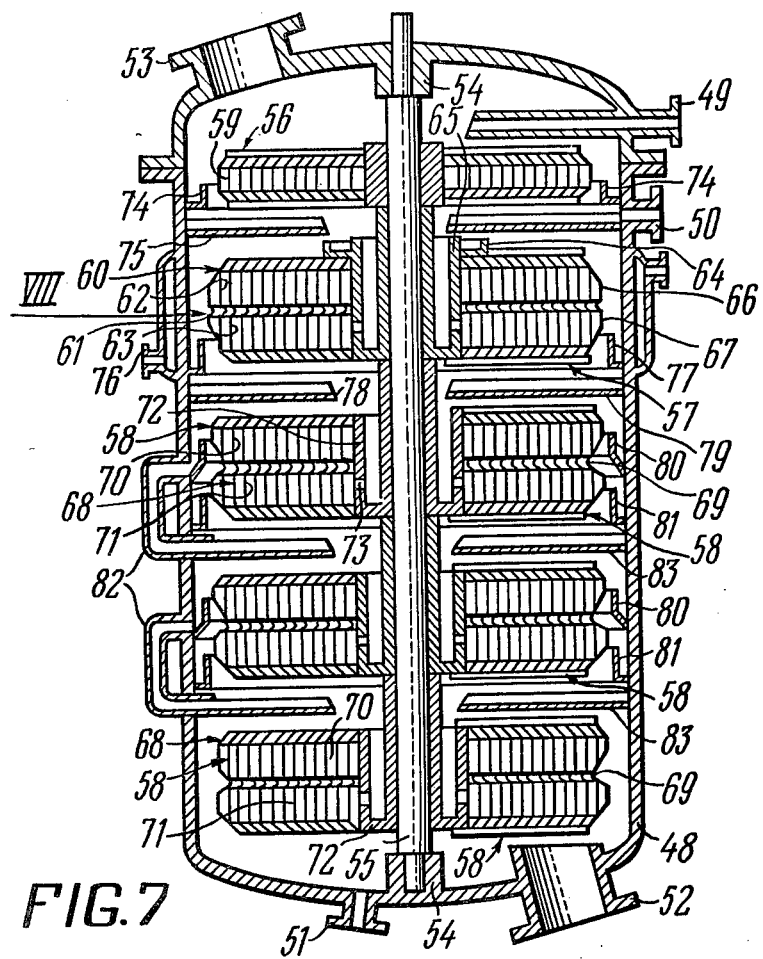
FIG. 7 is a longitudinal section view of one more embodiment of a film-type rotary mass-and-heat exchange column, according to the invention.
Figures 8, 9:
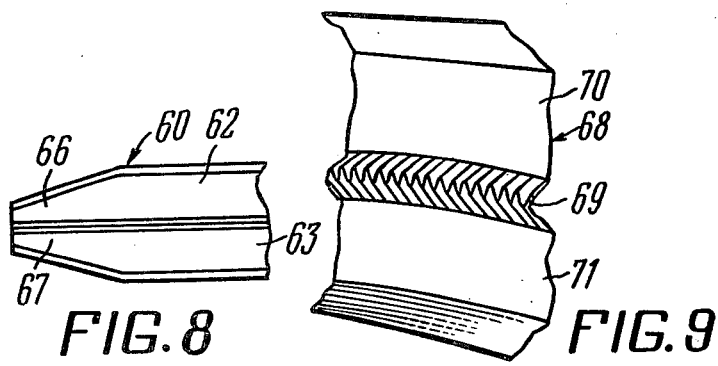
FIG. 8 is a view facing the arrow VIII in FIG. 7.
FIG. 9 is a scaled-up isometric representation of an element of one more embodiment of the spiral band, according to the invention.

The contact stages 58 (FIG. 7) are defined by spiral flanged bands 68 provided with adequately high longitudinal beads 69 (FIGS. 7, 9). The beads 69 are corrugated in order to cause additional turbulence of the gaseous phase; they form a top channel 70 and a bottom channel 71 on the bands 68. The peripheral ends of the channels 70, 71 are likewise constricted. Provision is made at the centre of each contact stage 58 (FIG. 7) for only one circular sleeve having ports 73 for the liquid to discharge onto the central ends of the bottom channels 71.

The mass-and-heat exchange apparatus comprises also devices for the liquid to flow over from one contact stage 56, 57, 58 onto the other. The device for the liquid (concentrated nitric acid) to flow over from the topmost contact stage 56 onto the mixing contact stage 57 consists of a circular pocket 74 and a downflow spout 75 whose discharge end is brought close to the circular sleeve 64 communicating with the top channels 62 of the bands 60. Thus, the top channels 62 serve for admitting the concentrated acid flowing down from the upper (concentrating) column section. Brought to the circular sleeve 65 is the sleeve 50 for admitting the feed stock into the shell 48, viz., a mixture of the original 60-percent acid with 70-percent magnesium-nitrate flux. The circular sleeve 65 communicates with the bottom channels 63. Thus, the channels 62 and 63 handle chemically different liquids. The ends 66 and 67 of the channels 62 and 63 are so oriented that the different liquid components discharged from the channels 62 and 63 would intermix in the liquid film on the inside surface of the shell 48. As some heat is liberated upon intermixing said liquids which might result in an excess and undesirable evaporation of the mixture thus obtained, the circular space of the shell 48 that embraces the mixing contact stage 57 must be provided with a cooling jacket 76. Located under the contact stage 57 is a circular pocket 77 linked to the shell 48 and communicating with downflow spouts 78, 79.

The contact stages 58 are adapted for a conventional mass-and-heat transfer process proceeding between the ascending vapours of nitric acid and the three-component mixture (magnesium nitrate, nitric acid, water) running over the concave surface of the spiral bands 68.

The device for the liquid to flow over from one contact stage 58 onto the other is made essentially as two circular pockets 80, 81 and two downflow spouts 82, 83. The downflow spout 82 communicates with the top circular pocket 80 which embraces the superjacent contact stage 58, the discharge end of said spout terminating immediately above the top edges of the spiral bands so that the liquid from the downflow spout 82 is delivered only to the top channels 70 of the bands 68, whereas the adequately high longitudinal corrugated bead 69 prevents the liquid from flowing down further to the bottom channels 71.

The downflow spout 83 establishes communication between the bottom circular pocket 81 of one contact stage 58 and the perforated circular sleeve 72 which in turn communicates, through the ports 73, with the bottom channels 71 of the other contact stage 58. Thus, the adjacent channels 70 and 71 of one contact stage 58, lying at different height are communicated with the adjacent channels 70 and 71 of the subjacent contact stage 58 which are arranged correspondingly as for height.

One more embodiment of the film-type rotary mass-and-heat exchange column according to the present invention realizes further characteristic features thereof concerned with an increased uniformity of liquid distribution between all the channels of the contact stage.

The column has a vertical cylindrical shell 84 (FIG. 10) accommodating a rotatable shaft 85 arranged coaxially therewith and carrying contact stages 86. The shell 84 is provided with means for admitting the original stock involved in the process and withdrawing the end products therefrom.

The drawing representing only the middle column portion, said means being illustrated therein.

The contact stage 86 is made up by two spiral bands 87, 88 (FIGS. 10, 11) each being provided with two longitudinal beads 89 (FIG. 10) which divide the raceway of each band 87 or 88 into three channels adjacent for height, i.e., a top channel 90, a middle channel 91 and a bottom channel 92. The central ends of each band 87, 88 have stepped recesses arranged in such a manner that a central end 93 (FIG. 12) of the top channel 90 is more removed from the shaft 85 than a central end 94 of the middle channel 91 which in turn is more removed from the shaft 85 than a central end 95 of the bottom channel 92.

Figure 10:
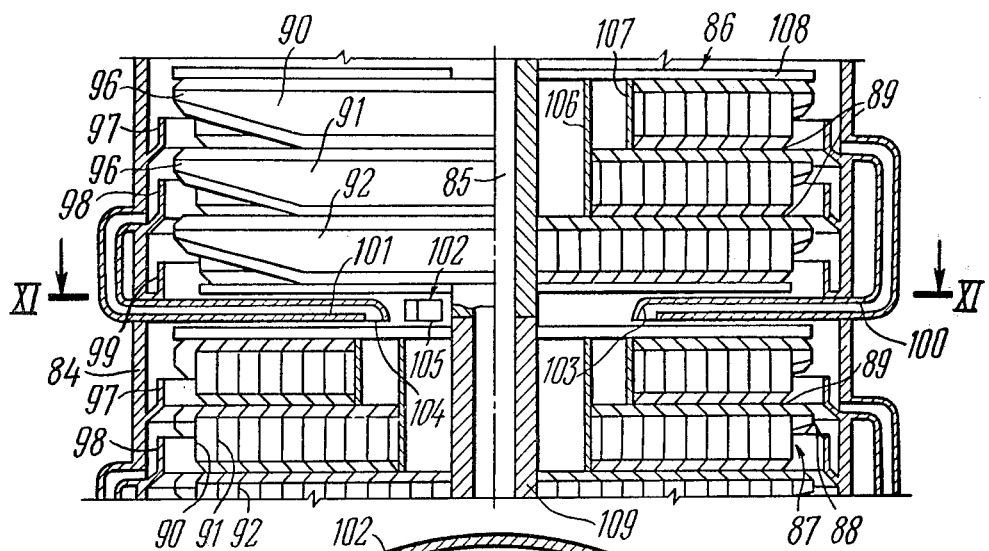
FIG. 10 is a longitudinal section view of still another embodiment of a film-type rotary mass-and-heat exchange column, according to the invention.
Figure 11:
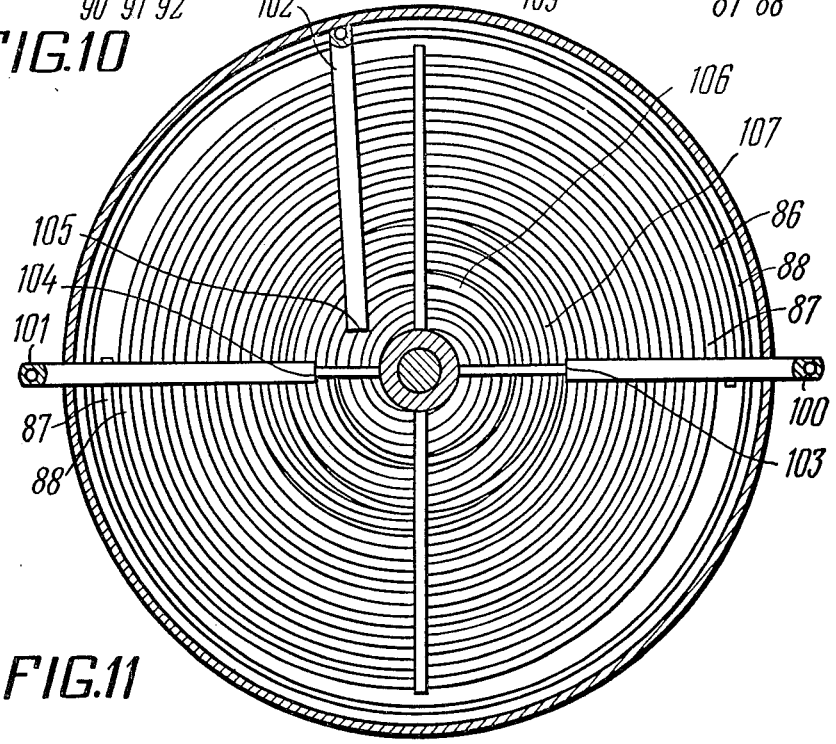
FIG. 11 is a section taken along the line XI—XI in FIG. 10.

Peripheral ends 96 (FIG. 10) of the adjacent channels 90, 91, 92 are somewhat constricted in order to provide a strictly directional delivery of the liquid onto the walls of the shell 84. The device for the liquid to flow over from one contact stage 86 onto the other is made as three circular pockets 97, 98, 99 and three downflow spouts 100, 101, 102. The downflow spout 100 is communicated with the top circular pocket 97, while its discharge end 103 is situated immediately above the top channels 90, whereby the liquid thrown off from the top channels 90 of the superjacent contact stage 86 gets then onto the top channels 90 of the subjacent contact stage 86. The reasonably high longitudinal bead 89 prevents the liquid from flowing over from the top channel 90 to the middle channel 91. The downflow spout 101 communicates with the middle circular pocket 98, while its discharge end 104 is located over the central ends 94 (FIG. 12) of the middle channels 91 of the subjacent contact stage 86 (FIG. 10). The downflow spout 102 communicates with the bottom circular pocket 99 and its discharge end 105 is situated above the central ends 95 (FIG. 12) of the bottommost channels 92.

The aforesaid recesses in the spiral bands 87, 88 (FIG. 12) give free admission of the liquid streams flowing down from the discharge ends 103, 104, 105 of the downflow spouts 100, 101, 102 from above onto the central (with respect to the contact stage 86) portions of the adjacent channels 90, 91, 92. The contact stage 86 may also be equipped with concentric cylinder-shaped separator shields 106, 107 adapted to prevent intermixing of the liquid streams delivered from the different downflow spouts 100, 101, 102.

The spiral bands 87, 88 are interlinked with a central bushing 109 through radial ribs 108. The bushing 109 is adapted for holding the contact stages 86 to the shaft 85, whereby the stages are imparted rotary motion and the liquid flows in the form of a film along the adjacent channels 90, 91, 92 by virtue of centrifugal forces. The constructed peripheral ends 96 of the adjacent channels 90, 91, 92 are pointed at the areas of the inner surface of the shell 84 that are situated over the circular pockets 97, 98, 99. This provides for the liquid to be caught by the respective circular pockets 97, 98, 99.

Thus, the differently located (as for height) adjacent channels 90, 91, 92 of the superjacent contact stage 86 are communicated with the correspondingly arranged (as for height) adjacent channels 90, 91, 92 of the subjacent contact stage 86. Thereby the motive power of the mass-and-heat transfer process and thence its efficiency are increased.

In still another embodiment of the film-type rotary mass-and-heat exchange column made according to the present invention provision is made for an improved intermixing of the liquid film on the inner side of the column shell. The apparatus of the type set forth hereinbelow can be used not only for gas-to-liquid mass-and-heat transfer but also for vaporization of the liquid film under vigorous intermixing.

The column features a vertical cylinder-shaped shell 110 (FIG. 13), wherein a shaft 111 is mounted rotatably and coaxially with the shell, said shaft carrying contact stages 112, 113. The shell 110 is provided with means for admitting therein the original stock involved in the process and withdrawing the end products therefrom. Said means incorporate a top sleeve for the liquid to be let in, a bottom sleeve 115 for the liquid to be let out, and a top sleeve 116 for the vapour formed in the shell 110 to escape therefrom.

The top contact stage 112 is built up of spiral bands 117 flanged at the edges and devoid of any beads; it is also adapted for dividing the total liquid flow delivered from the sleeve 114, into four equal flows. Accordingly, a circular pocket 118 is provided round the contact stage 112, said pocket being secured on the inner surface of the shell 110 and subdivided by four transverse separator plates 119 (FIG. 14) into four equal circular sectors (quadrants) 120 communicating with downflow spouts 121, 122, 123, 124 differing in length. Thus, provision of the contact stage 112 (FIG. 13) and the sectors 120 (FIG. 14) of the circular pocket 118 (FIG. 13) ensures an equal amount of the liquid delivered to all the four downflow spouts 121, 122, 123, 124 (FIG. 14). Each contact stage 113 is made up by four spiral bands 125, each of them being provided with two longitudinal beads 126 to divide the raceway of each band 125 into four channels 127, 128, 129, 139 adjacent for height. Apart from this, each band 125 has stepped recesses arranged in such a manner that central ends 131, 132, 133, 134 (FIG. 15) of the adjacent channels 127, 128, 129, 130 are spaced differently apart from the shaft 111.

Said recesses give free access from above for the liquid streams discharged from the downflow spouts 121, 122, 123, 124 onto the central (with respect to the contact stage 113 (FIG. 13)) portions of the adjacent channels 127, 128, 129, 130.

The contact stage 113 may also be provided with concentric cylinder-shaped separator shields 135, 136, 137 adapted to ensure against intermixing of the liquid streams discharged from the different downflow spouts 121, 122, 123, 124.

The spiral bands 117 are interlinked with a bushing 139 through radial ribs 138, while the spiral bands 125 are interconnected with a bushing 141 through radial ribs 140. The bushings 139 and 141 are adapted for holding the contact stages 112, 113 to the shaft 111, whereby said stages are imparted a rotary motion and the liquid is urged by centrifugal forces to move, as a film, along the adjacent channels 127, 128, 129, 130.

Peripheral ends 142, 143, 144, 145 (FIG. 14) of the channels 127, 128, 129, 130 are somewhat constricted and spaced apart in height, i.e., their discharge edges 146 (FIG. 13) are situated in various cross-sectional levels of the shell 110. This refers also to the channels disposed at the same height. For instance, the bottom channels 130 of the spiral bands 125 have their peripheral ends 142, 143 somewhat constricted, as well as the peripheral ends 144, 145 (not shown in FIG. 13) whose discharge edges 146 are disposed at different levels, i.e., spaced apart in height. Such a constructional arrangement of the contact stage 113 ensures uniform turbulence of the liquid film flowing down along the inner surface of the shell 110. In cases where the shell 110 is provided with an outside heating jacket 147 this results in an intensified heat-transfer process in the film and on the inner surface of the shell 110, whereby the liquid vaporizes.

To collect the liquid thrown off from the contact stage 113, a circular pocket 118 is provided, which is divided into four equal circular sectors (quadrants) 120 communicating with the downflow spouts 121, 122, 123, 124 brought to the subjacent contact stage 113.

The film-type rotary mass-and-heat column in its embodiment as illustrated in FIG. 1, operates as follows.

The shaft 7 carrying the contact stages 9 is imparted rotary motion from the drive not shown in the drawing. The process liquid is fed through the top sleeve 3 onto the top contact stage 9, with the result that the flow of liquid is broken by the edges 13 of the spiral bands 10, 11, 12 into fine streams which, while being acted upon by centrifugal forces, run over the concave surface of the bands 10, 11, 12. So the liquid fills the top channels 22 of the bands 10, 11, 12, while the surplus liquid flows over the ridge of the longitudinal beads 21 into the bottom channels 23 of the bands 10, 11, 12. The liquid in the shape of a film moves along the bands 10, 11, 12 under the effect of centrifugal forces from the centre towards the periphery of the contact stages 9. Then the liquid flows from the peripheral ends of the bands 10 onto the bands 11, and from the ends of the bands 11, onto the bands 12. Next the liquid is thrown onto the inner surface of the shell 1, from whence it flows as a film into the circular pocket 17 and further passes through the downflow spout 18 into the subjacent contact stage 9. The liquid thrown off from the bottommost contact stage 9 is withdrawn from the shell 1 via the outlet sleeve 5. The process gas is admitted to pass to the shell 1 through the inlet sleeve 2, wherefrom it goes along the gaps 16 between the spiral bands 10, 11, 12 while contacting the liquid film running over said bands 10, 11, 12. While passing by the beads 21 the gas becomes turbulent and is intermixed, whereby the mass-and-heat transfer process is intensified. Then the gas is free to escape from the apparatus through the outlet sleeve 4.

The film-type rotary mass-and-heat exchange column of the invention, as illustrated in FIG. 4 operates in a similar way, the only difference residing in the fact that the liquid from the downflow spout 40 and the sleeve 26 is delivered to the perforated circular sleeves 42, wherefrom it is distributed, through the ports 43, among the respective channels 36, 37, 38. In addition, the shell 24 is provided with one more sleeve 27 for the liquid to let in. The apparatus is adapted for carrying out the process of rectification, and the sleeve 27 serves for admitting the liquid mixture to be separated, whereas the sleeve 26 is for admitting the reflux.

The film-type rotary mass-and-heat exchange column of the invention, as represented in FIG. 7, may be employed for carrying out the process of rectification of, for example, nitric acid in the presence of magnesium nitrate under vacuum. The reflux medium (strong nitric acid in this particular case) is fed into the column through the inlet sleeve 49 to get onto the top contact stage 56, from whence it is thrown off into the circular pocket 74. From the latter the liquid is delivered via the downflow spout 75 into the circular sleeve 64 and further on, to the top channels 62 of the bands 60. Then the liquid is directed via the constricted ends 66 of the top channels 62 onto the walls of the shell 48. As the nitric acid under process flows along the contact stages 56 and 57, gradual accumulation of the low-boiling component, i.e., water occurs therein due to its being contacted with the counter-current vapours. The original stock, that is, a 60 percent nitric acid to be concentrated in a mixture with a great amount of 70 percent magnesium nitrate flux is delivered to the circular sleeve 65 and then through the ports 73, to the central ends of the bottom channels 63 of the contact stage 57 to flow therealong in the form of a film under the effect of centrifugal forces. Then said mixture passes through the constricted ends 67 of the bottom channels 63 to get onto the same circular area of the walls of the shell 48 as the nitric acid does from the constricted ends 66 of the top channels 62. So a vigorous intermixing of the two film-shaped flows occurs on that area. As the concentration of magnesium nitrate somewhat drops as a result of intermixing, the thus-formed liquid mixture gets heated; the excess heat is removed due to the provision of the cooling jacket 76 so that the temperature of the mixture remains in control. The above mixture collects in the circular pocket 77; half the total amount of said mixture is discharged through the downflow spout 78 directly onto the top channels 70 of the contact stage 58, while the other half of the mixture flows down through the downflow spout 79 into the perforated circular sleeve 72 communicating with the bottom channels 71 of the same contact stage 58. Then the liquid is thrown off from the top channels 70 into the circular pocket 80, and from the bottom channels 71, into the circular pocket 81. From the circular pocket 80 the liquid passes along the downflow spout 82 to the top channels 70 of subjacent contact stage 58, while from the circular pocket 81 the liquid flows along the downflow spout 83 to get into the circular sleeve 72 and further onto the bottom channels 71 of the same contact stage 58. Finally, the liquid containing only a negligible quantity of nitric acid, is withdrawn from the column bottom portion through the outlet sleeve 51. Vapours consisting mostly of water, are admitted to the shell 48 through the inlet sleeve 52, whereas vapours of strong nitric acid are withdrawn from the shell 48 through the outlet sleeve 53.

The film-type rotary mass-and-heat exchange column as shown in FIG. 10, operates as follows.

The process gas ascends inside the column while contacting the liquid film running over the adjacent channels 90, 91, 92 of the contact stages 86. The liquid is thrown off from the contact stage 86 at different levels so that the liquid from the channels 90, 91, 92 gets into the respective circular pockets 97, 98, 99; through the downflow spouts 100, 101, 102 the liquid flows down onto the subjacent stage 86.

Figure 13:
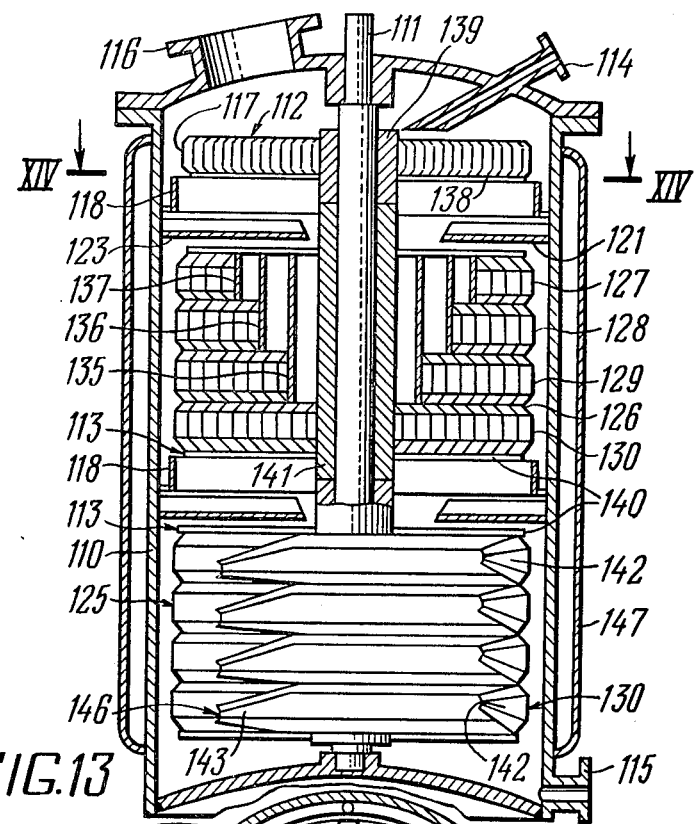
FIG. 13 is a longitudinal section view of yet still another embodiment of a film-type rotary mass-and-heat exchange column, according to the invention.
Figure 14:
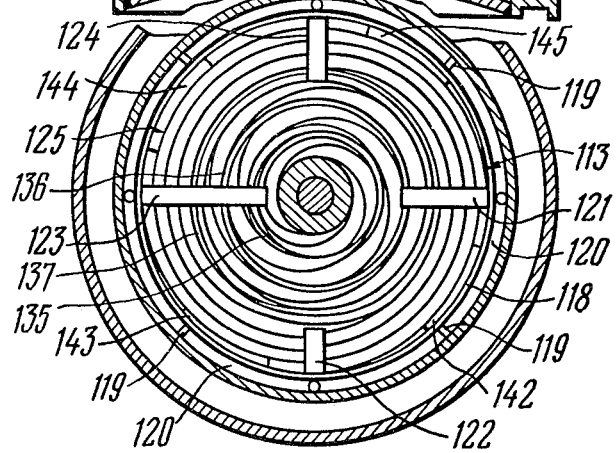
FIG. 14 is a section taken along the line XIV—XIV in FIG. 13.

The film-type rotary mass-and-heat exchange column of the invention as shown in FIG. 13, may be used not only for mass-transfer processes but also for evaporating the liquid in the form of a film.

The process liquid is fed through the inlet sleeve 114 onto the top contact stage 112, wherefrom it is then thrown off onto the walls of the shell 110 to flow down into the sectors 120 of the circular pocket 118. Then the liquid flows through the downflow spouts 121, 122, 123, 124 (FIG. 14) directly to the respective adjacent channels 127, 128, 129 (FIG. 13) of the subjacent contact stage 113. Urged by centrifugal forces, the liquid flows along the channels 127, 128, 129, 130 from the centre of the contact stage 113 towards its periphery; then the liquid is discharged through the peripheral ends 142, 143, 144 (FIG. 14) of the channels 127, 128, 129 (FIG. 13) at different levels to get onto the inside heated surface of the shell 110. The result is a uniformly turbulent film of boiling liquid. The envaporized part of the liquid collects in the circular pocket 118 from whence it is fed again onto the same contact stage 113 but situated below. The remainder of the liquid is withdrawn from the apparatus through the outlet sleeve 115. The resultant vapour is free to escape through the outlet sleeve 116. Contacting of the vapour phase and the liquid film occurs inside the shell 110 on the spiral bands 125 run with the liquid. Since the boiling temperature of the liquid gradually increases as the liquid evaporates during distillation of the liquid mixtures, the temperature of the vapours ascending from the bottom column portion proves to be higher than the temperature of the liquid on the superjacent contact stages 86.

That is why superheating of the vapours is eliminated due to its contact with the liquid film which is partly vaporized as a result. Vapours withdrawn from the apparatus are no longer superheated.

What is claimed is:

1. A film-type rotary mass-and-heat exchange column, comprising: a shell; means for admitting into said shell the original stock involved in the process, and withdrawing the end products therefrom; a vertical shaft rotatably mounted in said shell; a number of contact stages secured on said shaft; bands forming said contact stages, said bands being curved into spirals diverging from said shaft and flanged towards the shaft at their edges, which bands are provided with longitudinal beads bulging outwards on the concave surface of the bands to establish a number of channels adjacent in height; at least one device for the liquid to flow over from said superjacent contact stage onto the subjacent contact stage; at least one circular pocket of said device for the liquid to flow over, said pocket being secured on the inner side wall of the shell and serving for receiving the liquid thrown off from said superjacent contact stage; a downflow spout of said device for the liquid to flow over; the intake end of said downflow spout communicated with said circular pocket; the discharge end of said downflow spout arranged above said subjacent contact stage.

2. A film-type rotary mass-and-heat exchange column as claimed in claim 1, wherein said bands forming said contact stage, differ in length and terminate at different distances from the shaft, said different-length bands being arranged round the shaft in a periodically recurrent sequence.

3. A film-type rotary mass-and-heat exchange column as claimed in claim 2, comprising circular sleeves located in the central portions of said contact stages coaxially with said shaft under said discharge ends of the downflow spouts and communicating with said adjacent channels of the bands.

4. A film-type rotary mass-and-heat exchange column as claimed in claim 2, wherein the bottoms of said adjacent channels formed by said beads, are somewhat inclined towards said shaft and are so arranged that the line of conjugation of each bead with the bottom of the subjacent channel is more removed from the shaft than the line of conjugation of said bead with the bottom of the superjacent channel.

5. A film-type rotary mass-and-heat exchange column as claimed in claim 1, comprising circular sleeves located in the central portions of said contact stages coaxially with said shaft under said discharge ends of the downflow spouts and communicating with said adjacent channels of the bands.

6. A film-type rotary mass-and-heat exchange column as claimed in claim 5, wherein the bottoms of said adjacent channels formed by said beads, are somewhat inclined towards said shaft and are so arranged that the line of conjugation of each bead with the bottom of the subjacent channel is more removed from the shaft than the line of conjugation of said bead with the bottom of the superjacent channel.

7. A film-type rotary mass-and-heat exchange column as claimed in claim 1, wherein the bottoms of said adjacent channels formed by said beads, are somewhat inclined towards said shaft and are so arranged that the line of conjugation of each bead with the bottom of the subjacent channel is more removed from the shaft than the line of conjugation of said bead with the bottom of the superjacent channel.

8. A film-type rotary mass-and-heat exchange column as claimed in claim 1, wherein said adjacent channels feature their peripheral ends being somewhat constricted.

9. A film-type rotary mass-and-heat exchange column as claimed in claim 8, wherein said constricted peripheral ends of at least two adjacent channels of said band are directed to the same spot of the wall of said shell.

10. A film-type rotary mass-and-heat exchange column as claimed in claim 8, wherein said contact stages incorporate a number of said bands, said adjacent channels of said bands located at the same level, having their constricted peripheral ends spaced apart in height.

11. A film-type rotary mass-and-heat exchange column as claimed in claim 1, comprising a plurality of said circular pockets made fast on the inner wall of the shell round each of the contact stages formed by the bands with the beads, the number of said circular pockets being equal to that of the adjacent channels of the bands of the contact stage round which said pockets are arranged, said circular pockets serving for a separate reception of the liquid delivered from adjacent channels lying at different levels and being communicated, through said downflow spouts, with the adjacent channels of the subjacent contact stage that are correspondingly arranged as for height.

12. A film-type rotary mass-and-heat exchange column, comprising: a shell; means for admitting into said shell the original stock involved in the process, and withdrawing the end products therefrom; a vertical shaft rotatably mounted in said shell; a number of contact stages secured on said shaft; bands forming said contact stages, said bands being curved into spirals diverging from said shaft and flanged towards the shaft at their edges, which bands are provided with longitudinal beads bulging outwards on the concave surface of the bands so as to establish a number of channels adjacent in height; said bands having central ends located nearby said shaft and provided with stepped recesses arranged in such manner that said adjacent channels of the bands originate at such a distance from the shaft that is the longer the higher the level at which said channels are situated; at least one device for the liquid to flow over from said superjacent contact stage onto the subjacent contact stage; at least one circular pocket of said device for the liquid to flow over, said pocket being secured on the inner side wall of said shell to serve for receiving the liquid thrown off from said superjacent contact stage; downflow spouts of said device for the liquid to flow over; intake ends of said downflow spouts communicated with said circular pocket; discharge ends of said downflow spout located above the initial portions of said adjacent channels of the bands which establish the subjacent contact stage.

13. A film-type rotary mass-and-heat exchange column as claimed in claim 12, comprising several said circular pockets held to the inner shell wall round each of the contact stages formed by the bands with the beads, the number of said circular pockets being equal to that of the adjacent channels of the bands of the contact stage round which said pockets are arranged, said circular pockets serving for a separate reception of the liquid from the adjacent channels lying differently as for height and being communicated, by way of said downflow spouts, with the correspondingly arranged for height adjacent channels of the subjacent contact stage.

* * * * *